United States Patent Office 3,097,843
Patented July 16, 1963

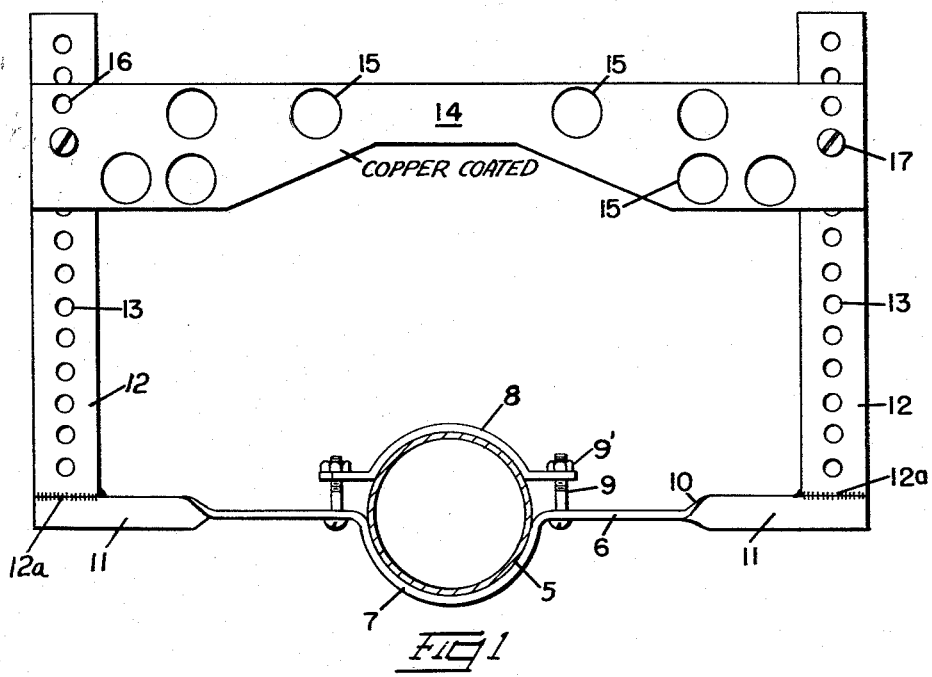
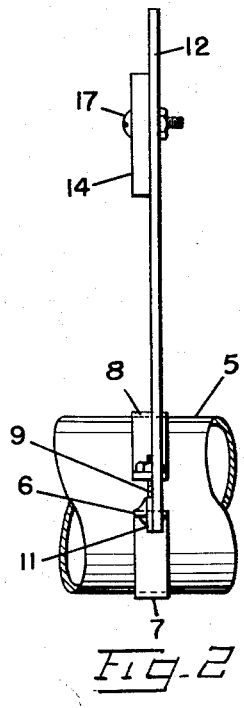

3,097,843
POSITIONING AND MAINTAINING DEVICE FOR ROUGHED-IN SERVICE PIPES
Robert C. Morrow, 725 S. 21st St., Paducah, Ky.
Filed Dec. 6, 1962, Ser. No. 242,883
4 Claims. (Cl. 269—40)

This invention contemplates the provision of a novel structure by means of which the service pipes of plumbing fixtures such as sinks and lavatories, may be initially positioned in accordance with the roughing-in dimensions prescribed by the manufacturer for the particular type of fixture which is to be used, and which structure will thereafter function to hold the roughed-in pipes in their established proper relationship until the time arrives for the final connecting up of the fixture.

Plumbers encounter many difficulties arising from the fact that in the interval between the initial roughing-in and the final connection of the fixture, other artisans such as carpenters, plasterers, or the like, carry forward the completion phases of their work, during which the roughed-in pipes may be pushed or bent from their roughed-in positions.

The manner in which this invention functions to facilitate the initial locating of the pipes and their subsequent maintenance in their roughed-in location, will be best understood by reference to the accompanying drawing, in which:

FIG. 1 is a view of the device of the invention showing it clamped to the waste or drain pipe of the proposed fixture installation; and FIG. 2 is an end elevation of the structure of FIG. 1.

Like numerals designate corresponding parts in both of said figures.

The device may be used in conjunction with either a vertical or a horizontal waste as hereinafter set forth.

In the drawing, 5 designates the waste pipe of the contemplated installation. A steel bar 6 has a half clamp bend 7 at its central portion with which bend a clamp half 8 coacts. Screws 9 and nuts 9' draw these clamping elements into firm and secure engagement with the waste pipe 5. The bar 6 extends in opposite directions from bend 7 and is twisted as at 10 to cause its outer end portions 11 to lie perpendicularly with respect to the axis of the waste pipe 5. Each of the end portions 11 overlaps and is securely and rigidly welded to a steel strap 12 at 12a, said straps each having a row of openings 13 formed therethrough.

Thus the bar 6 and straps 12 complementally form a rigid element of inverted U shape. Extending between the legs 12 of said element is a sheet steel plate 14. Plate 14 has a group of positioning openings 15 formed therethrough the function of which openings is to receive temporary end sections of hot and cold water service pipes. Plate 14 is preferably copper plated so that the temporary pipe sections may easily be tacked thereto with soft solder.

Plate 14 has openings 16 formed therein for the reception of screws 17 by means of which plate 14 may be adjusted toward or from the ends of straps 12, to thereby adjust the centers of the temporary roughed-in pipe sections (disposed in any of the openings 15) with respect to the center of the waste pipe 5.

The plate 14 does more than merely to position the service pipes of a single type of installation or plumbing fixture. Its openings 15 are in such number and relation as to adapt the device to serve to position the roughed-in pipes of practically all standard sinks and lavatories, whether these be large and small fixtures of the same manufacturer or whether they be fixtures of varying patterns of several manufacturers.

The openings 13 may be threaded to permit screws 17 to engage therein or the screws may merely pass through said openings and have nuts upon their lower ends.

While the size of the openings 13 and 16 may be varied it is found advantageous to make the openings 13 quarter inch openings on half inch centers and to make the openings 16 quarter inch openings on three quarter inch centers. With this arrangement any adjustment in quarter inch increments is obtainable.

After locating the roughed-in positions of the pipes for a given installation the device of the invention is left on the pipes until fixture setting time arrives and that will be after other artisans have completed their work.

The invention is not limited to the particular arrangement shown and described but includes within its purview such changes as fairly fall within either the terms or the spirit of the appended claims.

I claim:

1. In a position maintaining structure for the roughed-in water supply pipes of a plumbing fixture, an elongated member having means whereby it may be securely mounted upon the waste pipe for such fixture, a rigid strap extending perpendicularly from each end of said member, a plate spanning the space between said straps, and means for adjusting said plate along said rigid straps, said plate having a plurality of water pipe receiving openings therethrough of a size to receive and temporarily position pipes being roughed in.

2. In a position maintaining structure for the roughed-in water supply pipes of a plumbing fixture, an elongated member having means whereby it may be securely mounted upon the waste pipe for such fixture, a rigid strap extending perpendicularly from each end of said member, a plate spanning the space between said straps, and means for adjusting said plate along said rigid straps, said plate having a plurality of water pipe receiving openings therethrough of a size to receive and temporarily position pipes being roughed in, said water pipe receiving openings being in such number and position as to provide roughing-in locating for a plurality of standard plumbing specifications.

3. A device for locating water service pipes for plumbing fixtures in roughing-in operations comprising a rigid member of inverted U shape consisting of an elongated bar, clamping means dimensioned to embrace the waste pipe of the installation, a rigid strap attached to each end of the bar, an elongated plate spanning the space between said straps, and means for adjusting and binding the plate to said straps in determined increments toward and from the ends of said straps, and toward and from the waste pipe center, said plate having a plurality of water pipe receiving openings therethrough in such number pipe receiving openings therethrough in such number and positions that said plate, in conjunction with its capability of being shifted toward and from the waste pipe center, will provide roughing-in reception for substantially all standard sink and lavatory installation specifications.

4. A device of the character described comprising an elongated bar having a clamp at substantially the center of its length, said clamp being of such dimension and construction as to embrace and grip a fitting of waste pipe size, a strap extending from each end of the bar and rigidly secured to said bar, said straps projecting in parallel relation in the same direction away from said bar and lying perpendicular to the axis of said clamp, a plate mounted upon said straps, the opposite ends of which plate carries binding means for binding said plate to said straps, said plate having a plurality of water pipe receiving openings formed therethrough of a size to receive water supply pipes in roughing in the same.

References Cited in the file of this patent

UNITED STATES PATENTS 2,774,134     Smith et al. _____ Dec. 18, 1956

FOREIGN PATENTS 918,106     France _____ Oct. 7, 1946